United States Patent
Varos

(10) Patent No.: US 6,941,660 B1
(45) Date of Patent: Sep. 13, 2005

(54) POWER HAND TOOL WITH SAW BLADE AND PIPE ENGAGING BRACKET FOR CUTTING A PIPE

(76) Inventor: Leo Varos, 222 E. 4$^{th}$ St., Cheyenne, WY (US) 82001

( * ) Notice: Subject to any disclaimer, the term of this patent is extended or adjusted under 35 U.S.C. 154(b) by 0 days.

(21) Appl. No.: 10/874,386

(22) Filed: Jun. 24, 2004

(51) Int. Cl.$^7$ .......................... B23D 21/06; B23D 47/04
(52) U.S. Cl. ............................ 30/93; 30/378; 269/54 C
(58) Field of Search ...................... 30/93, 378; 451/69, 451/70, 381; 269/43, 54 C; 83/54, 745, 744; 144/253.1–253.9, 34.1, 34.2

(56) References Cited

U.S. PATENT DOCUMENTS

| | | | | |
|---|---|---|---|---|
| 1,518,198 A | * | 12/1924 | Heame | 83/745 |
| 1,588,744 A | * | 6/1926 | Keane | 30/378 |
| 2,645,011 A | * | 7/1953 | Otis | 30/378 |
| 2,748,475 A | * | 6/1956 | Gray | 30/378 |
| 3,073,073 A | * | 1/1963 | Van Pelt | 83/745 |
| 3,115,910 A | * | 12/1963 | Steiner | 30/293 |
| 3,805,383 A | * | 4/1974 | McNally | 30/378 |
| 3,834,019 A | * | 9/1974 | Smeltzer et al. | 30/378 |
| 4,294,012 A | * | 10/1981 | Lanz | 30/378 |
| 4,347,634 A | * | 9/1982 | Sawan | 30/205 |
| 4,602,435 A | * | 7/1986 | Nishioka | 83/745 |
| 6,449,851 B1 | * | 9/2002 | Bone et al. | 30/378 |
| 6,578,267 B2 | * | 6/2003 | Seyfer | 30/93 |

* cited by examiner

Primary Examiner—Allan N. Shoap
Assistant Examiner—Jason Prone
(74) Attorney, Agent, or Firm—Edwin H. Crabtree; Ramon L. Pizarro; Donald W. Margolis

(57) ABSTRACT

A electrical power tool with a circular saw blade attached to a drive shaft of an electric motor. The power tool includes a pipe engaging bracket. The pipe-engaging bracket includes a "L" shaped bracket arm having a first arm member and a second arm member. The first arm member is attached to a side of the housing. The second arm member is at right angles to the first arm member. The second arm member includes a pair of spaced apart guide pin holes for receiving a center portion of a pair of guide pins therethrough. An upper portion of the guide pins is received through a pair of coil springs. The coil springs are held on the upper portion of the guide pins using spring stops. A lower portion of the guide pins includes ends attached to a guide arm. The guide arm is parallel to the second arm member. The guide arm includes a pair of spaced apart guide fingers with pipe grooves therein. The guide fingers are disposed on opposite sides of the saw blade. The pipe grooves are adapted for receiving a portion of a pipe to be cut by the saw blade.

18 Claims, 1 Drawing Sheet

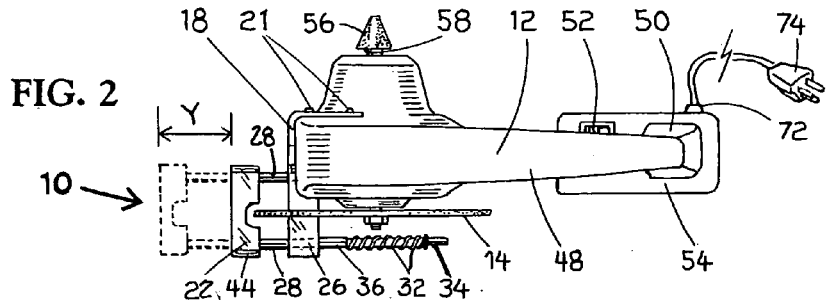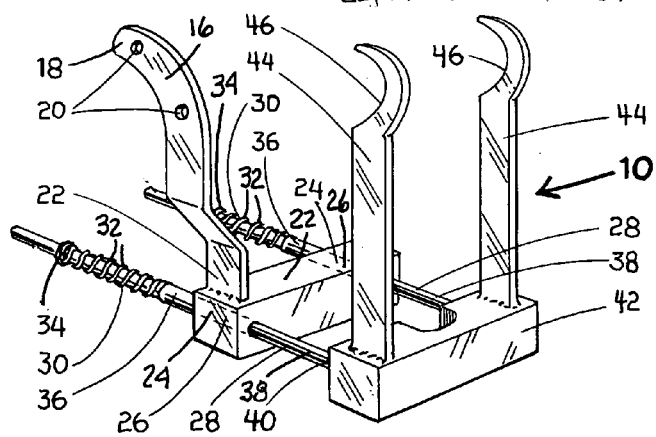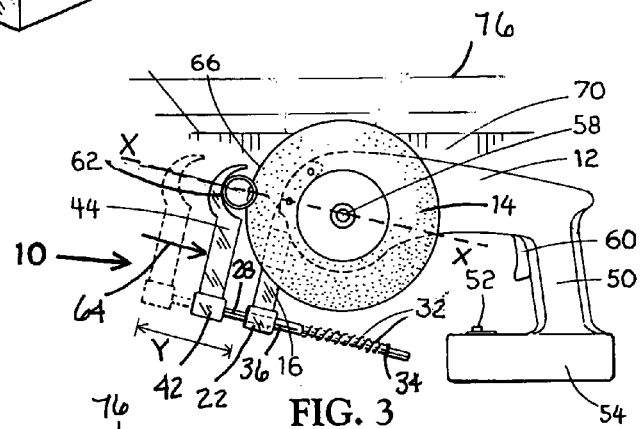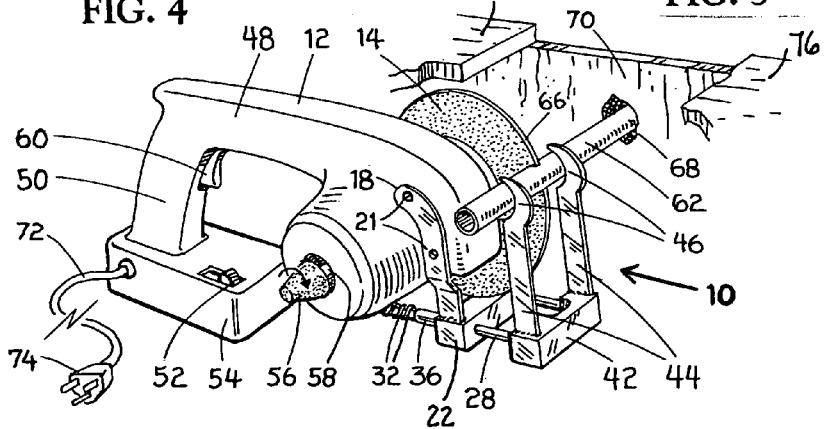

POWER HAND TOOL WITH SAW BLADE AND PIPE ENGAGING BRACKET FOR CUTTING A PIPE

BACKGROUND OF THE INVENTION (a) Field of the Invention

This invention relates to a hand tool with saw blade for cutting a pipe and more particularly, but not by way of limitation, to a power hand tool having a circular saw blade and a spring biased pipe engaging bracket used for engaging and cutting a pipe, a conduit and the like having diameters in a range of ½ to 1 inches. The power hand tool used during building construction, remodeling of a building and other pipe cutting applications.

(b) Discussion of Prior Art

Heretofore, there have been a variety of different types of pipe cutters where the tool or pipe is rotated around a pipe axis for cutting the pipe. Also, there are electrical powered and unpowered pipe cutting tools using a pair of guide rollers and a cutting roller centered around the axis of the pipe to be cut.

In U.S. Pat. No. 6,578,267 to Seyfer, an air tool is disclosed having an air motor and cutting wheel for making cross-sectional cuts of tubing. The tool includes a feed lever pivotally attached to the air motor for guiding the tubing into engagement with the cutting wheel. In U.S. Pat. No. 6,095,021 to Epperson, a hand held pipe cutter is described having a sector gear received around a pipe to be cut. The sector gear is electrically driven and includes spring biased rotatable bearings and a cutting blade for engaging the sides of the pipe. In U.S. Pat. No. 6,067,716 to Carter, a plastic pipe cutter is illustrated having a reciprocating saw blade. The pipe cutter includes a way and pipe holder block for adjustment around a pipe to be cut. In U.S. Pat. No. 3,714,712 to Hoffman, a cutting or grooving tool is disclosed. The tool includes a series of cutting blades mounted on a carriage. A coil spring is used for engaging the blades and cutting a pipe. A stop is used to limit the penetration of the blades on the pipe.

None of the above mentioned prior art patents specifically disclose the unique features, structure and function of the subject electrical power hand tool having a saw blade and a spring biased pipe engaging bracket for cutting a pipe, conduit and the like.

SUMMARY OF THE INVENTION

In view of the foregoing, it is a primary objective of the subject invention to provide a pipe and conduit cutting power hand tool where the pipe or conduit is held in place during the cutting operating and the piece to be cut doesn't have to be rotated axially in relationship to the tool or the tool rotated around the cutting piece. The pipe is biased against and on both side of a saw blade mounted on the hand tool for making a clean crosscut and without binding the pipe against the saw blade as it's being cut.

Another object of the invention is the electrical power hand tool with saw blade and pipe engaging bracket can be used for reaching low accessibility pipe and conduit including, but not limited to, those being installed against walls, drop ceiling and other overhead areas.

Yet another object of the new power hand tool is to reduce the amount of manual labor and wrist motion needed to cut and ream pipes and conduits in various tight locations, thus increasing safety and reducing carpal tunnel syndrome, repetitive stress disorders, and other injuries that cause hardships to employees and added costs to employers.

Still another object of the invention is to speed up the installation of pipe and conduit, thereby reducing labor costs during construction.

The power hand tool includes a hand tool housing with a circular saw blade attached to a drive shaft of an electric motor. The motor is disposed inside the housing. A pipe engaging bracket is attached to a side of the hand tool housing. The pipe-engaging bracket includes a "L" shaped bracket arm having a first arm member and a second arm member. The first arm member includes holes therein for receiving attachment screws. The screws are used for securing the bracket to a side of the housing. The second arm member is at right angles to the first arm member. The second arm member includes a pair of spaced apart guide pin holes for receiving a center portion of a pair of guide pins therethrough. An upper portion of the guide pins is received through a pair of coil springs. The coil springs are held on the upper portion of the guide pins using spring stops. A lower portion of the guide pins includes ends attached to a guide arm. The guide arm is parallel to the second arm member. The guide arm includes a pair of spaced apart guide fingers with pipe grooves therein. The guide fingers are disposed on opposite sides of the saw blade. The pipe grooves are adapted for receiving a portion of a pipe to be cut. When a portion of the pipe is placed in the pipe grooves, the coil springs are compressed between the spring stops and in turn the pipe is biased against the saw blade. Using the compression of the coil springs the pipe is continuously biased against the saw blade until the pipe is cut in two during the operation of the power tool.

These and other objects of the present invention will become apparent to those familiar with various types of electrical power hand tools with saw blades used in cutting pipe, conduit and the like when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a perspective view of the pipe engaging bracket prior to attaching it to a side of an electrical power hand tool with saw blade.

FIG. 2 is a top view of the pipe engaging bracket attached to the side of the power hand tool and disposed next to the saw blade.

FIG. 3 is a side view of the pipe engaging bracket attached to the power hand tool and biasing a pipe toward the saw blade for cutting the pipe in two.

FIG. 4 is another perspective view of the pipe engaging bracket attached to the power hand tool and positioned for receiving and cutting an end of a pipe. The pipe is shown extending outwardly from a hole in a wall under construction.

DETAILED DESCRIPTION OF THE PREFERRED EMBODIMENTS

In FIG. 1, a perspective view of a pipe engaging bracket is shown and having general reference numeral 10. As mentioned above, the bracket 10 is attached to a side of an electrical power hand tool 12 with a circular saw blade 14. The power hand tool 12 with saw blade 14 and attached pipe engaging bracket 10 is shown in FIGS. 2–4.

The pipe engaging bracket 10 includes a "L" shaped bracket arm 16 having a first arm member 18 having holes 20 therein for receiving attachment screws 21 and securing the bracket 10 to a side and a front of the power hand tool 12. The screws 21 are shown in FIGS. 2 and 4. The bracket arm 16 also includes a second arm member 22 at right angles to the first arm member 18. The second arm member 22 includes a pair of spaced apart guide pin holes 24, shown in dashed lines, for slidably receiving a center portion 26 of a pair of guide pins 28 therethrough. An upper portion 30 of the guide pins 28 is received through a pair of coil springs 32. The coil springs 32 are held on the guide pins 28 using upper spring stops 34 and lower spring stops 36.

A lower portion 38 of the guide pins 28 includes ends 40 attached to a guide arm 42. The guide arm 42 is parallel to the second arm member 22. The guide arm 42 includes a pair of spaced apart guide fingers 44 with pipe grooves 46 therein. The guide fingers 44 are disposed on opposite sides of the saw blade 14. The pipe grooves 46 are adapted for receiving a portion of the pipe to be cut. When a portion of the pipe to be cut is placed in the pipe grooves 46, the coil springs 32 are compressed between the spring stops 34 and 36 and in turn the pipe is biased upwardly and against the saw blade 14. Using the compression of the coil springs 32, the pipe is continuously biased against the saw blade 14 until the pipe is cut in two, thus providing a clean crosscut of the pipe.

In FIG. 2, a top view of the pipe engaging bracket 10 is shown attached to the side and front of the power hand tool 12. The guide fingers 44 with pipe grooves 46 are shown disposed on opposite sides of the saw blade 14. The hand tool 12 includes a power tool housing 48, a handle grip 50 with "on" and "off" switch 52, a battery power pack 54 attached to the bottom of the hand grip 50 and a pipe reamer 56 attached to a drive shaft 58. The drive shaft 58 is attached to an electric motor disposed inside the housing 48. The motor is not shown in the drawings. A trigger 60, shown in FIGS. 3 and 4, is used for starting and stopping the power to the electric motor and the attached drive shaft 58, when the power is turned on and off to the power hand tool 12.

In FIG. 3, a side view of the pipe engaging bracket 10 is shown attached to the power hand tool 12 with the guide fingers 44 in an extended position and shown in dashed lines. In operation, the guide arm 42 or guide fingers 44 are gripped by hand and by sliding the guide pins 28 downwardly through the guide pin holes 24 in the second arm member 22. When the guide arm 42 and guide fingers 44 are extended, the coil springs 32 are compressed. At this time, sufficient room is provided between the pipe grooves 46 and a cutting edge 66 of the saw blade 14 for inserting a portion of a pipe 62 therebetween. The pipe 62 has a diameter typically in a range of ½ to 1 inches.

When the grip on the guide arm 42 or the guide fingers 44 is released, the pipe 62 moves inwardly, as indicated by arrow 64, and against the cutting edge 66 of the cutting blade 14. The electrical power to the blade 14 is now started and the cutting of the pipe 62 begins. It should be noted that the bias force of the coil springs 32 moves the pipe 62 toward and along a centerline X—X through the center of the drive shaft 58 attached to the cutting blade 14. The centerline X—X is parallel to the guide pins 28. In this manner, optimum performance in the cutting of the pipe by the cutting blade is provided.

In this drawing, the guide arm 42 and fingers 44 are shown moving upwardly a total distance "Y". The distance "Y" is amount of movement of the guide arm 42 and fingers 44 toward the cutting blade 14. This distance is in a range of 2 to 3 inches and sufficient to bias the pipe 62 cutting it completely in two. It should be noted that because the guide fingers 44 are disposed on both sides of the cutting blade 14, the bias force moving the pipe into the cutting blade is uniform thus preventing the pipe 62 from binding during the cutting operation.

In FIG. 4, another perspective view of the pipe engaging bracket 10 is shown attached to the power hand tool 12 and positioned for receiving the pipe 62 in the grooves 46 of the guide fingers 44 and for cutting an end of the pipe 62. In this drawing, the pipe 62 is shown extending outwardly from a hole 68 in a wall 70. Also shown in the drawing and in FIG. 2, is an optional electrical cord 72 with plug 74 extending outwardly from a side of the handle grip 50. Obviously, the electrical cord 72 with plug 74 can be used for providing electricity to the power hand tool rather than using the battery power pack 54.

It should be noted that by the position of the saw blade 14 and the pipe engaging bracket 10 on the power tool 12, the pipe 62 can be cut easily in difficult places to reach. For example, the pipe 62 in FIGS. 3 and 4 is close the top of a ceiling 76 and next to the wall 70 yet the power hand tool 12 can be easily be used in cutting the pipe and cleaning the end of the pipe using the pipe reamer 56.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An electrical hand operated power tool used for holding and cutting a portion of a pipe or conduit, the power tool comprising:
   a power tool housing with and electric motor and a drive shaft attached thereto, said electric motor disposed inside said housing;
   a circular saw blade attached to said drive shaft;
   a bracket arm attached to said housing, said bracket arm having a pair of guide pin holes;
   a pair of guide pins slidably received through said guide pin holes;
   a pair of coil springs received around an upper portion of said guide pins and held thereon;
   a guide arm attached to a lower portion of said guide pins; and
   a pair of spaced apart guide fingers, said guide fingers attached to said guide arm and extending outwardly therefrom, said guide fingers disposed on opposite sides of said saw blade, said guide fingers adapted for receiving a portion of the pipe and biasing the pipe against said saw blade during the operation of the power tool.

2. The power tool as described in claim 1 wherein said coil springs are held on the upper portion of said guide pins using spring stops.

3. The power tool as described in claim 1 wherein said guide fingers include pipe grooves therein, said pipe grooves adapted for receiving a portion of the pipe to be cut thereon.

4. The power tool as described in claim 1 wherein said bracket arm is a "L" shaped bracket arm having a first arm member, said first arm member having holes therein for receiving attachment screws and securing the bracket to a side and a front of said housing, said "L" shaped bracket arm also having a second arm member at right angles to said first arm member, said second arm member having said pair of spaced apart guide pin holes therein.

5. The power tool as described in claim 4 wherein said guide arm is parallel to said second arm member of said "L" shaped bracket arm.

6. An electrical hand operated power tool used for holding and cutting a portion of a pipe or conduit, the power tool comprising:
- a power tool housing with an electric motor and a drive shaft attached thereto, said electric motor disposed inside said housing;
- a circular saw blade attached to said drive shaft;
- a bracket arm attached to said housing, said bracket arm having a pair of guide pin holes;
- a center portion of a pair of guide pins slidably received through said guide pin holes;
- a pair of coil springs received around an upper portion of said guide pins and held thereon;
- a guide arm attached to a lower portion of said guide pins; and
- a pair of spaced apart guide fingers with pipe grooves therein, said guide fingers attached to said guide arm and extending outwardly therefrom, said guide fingers disposed on opposite sides of said saw blade, said pipe grooves adapted for receiving a portion of the pipe and biasing the pipe upwardly and against said saw blade when said coil springs are compressed on said guide pins.

7. The power tool as described in claim 6 wherein said bracket arm is a "L" shaped bracket arm having a first arm member, said first arm member having holes therein for receiving attachment screws and securing said bracket to a side of said housing, said "L" shaped bracket arm also having a second arm member at right angles to said first arm member, said second arm member having said guide pin holes therein.

8. The power tool as described in claim 7 wherein said coil springs are held on the upper portion of said guide pins using spring stops, said spring stops disposed on top of said guide pins and next to said second arm member.

9. The power tool as described in claim 7 wherein said guide arm is parallel to said second arm member of said "L" shaped bracket arm.

10. An electrical hand operated power tool used for holding and cutting a portion of a pipe or conduit, the power tool comprising:
- a power tool housing with an electric motor and a drive shaft attached thereto, said electric motor disposed inside said housing, said housing having a handle grip with a handle trigger electrically connected to said motor for starting and stopping power to said motor;
- a circular saw blade attached to said drive shaft;
- a bracket arm attached to said power tool housing, said bracket arm having a pair of guide pin holes therein;
- a center portion of a pair of guide pins slidably received through said guide pin holes;
- a pair of coil springs received around an upper portion of said guide pins and held thereon;
- a guide arm attached to a lower portion of said guide pins; and
- a pair of spaced apart guide fingers, said guide fingers attached to said guide arm and extending outwardly therefrom, said guide fingers disposed on opposite sides of said saw blade, said guide fingers adapted for receiving a portion of the pipe and biasing the pipe upwardly and against said saw blade when said coil springs are compressed on said guide pins.

11. The power tool as described in claim 10 wherein said guide fingers include pipe grooves therein, said pipe grooves adapted for receiving a portion of the pipe to be cut thereon.

12. The power tool as described in claim 10 further including a pipe reamer attached to said drive shaft and extending outwardly from a side of the said housing, said pipe reamer adapted for cleaning a freshly cut end of the pipe.

13. The power tool as described in claim 10 further including an electric cord attached to said housing and electrically connected to said motor for proving power thereto.

14. The power tool as described in claim 10 wherein said bracket arm is a "L" shaped bracket arm having a first arm member, said first arm member having holes therein for receiving attachment screws and securing said "L" shaped bracket arm to a side of the said housing, said "L" shaped bracket arm also having a second arm member at right angles to said first arm member, said second arm member having said guide pin holes therein.

15. The power tool as described in claim 14 wherein said coil springs are held on the upper portion of said guide pins using spring stops, said spring stops disposed on top of said guide pins and next to said second arm member.

16. The power tool as described in claim 14 wherein said guide arm is parallel to said second arm member of said "L" shaped bracket arm.

17. The power tool as described in claim 10 further including a battery power pack attached to said housing and electrically connected to said motor for providing power thereto.

18. The power tool as described in claim 17 further including an "on" and "off" switch on said battery power pack for turning power on and off to said motor.

* * * * *